(12) United States Patent
Emery et al.

(10) Patent No.: US 6,617,559 B1
(45) Date of Patent: Sep. 9, 2003

(54) LIGHT ARRANGEMENT FOR VISION SYSTEMS

(75) Inventors: Keith Emery, San Diego, CA (US); George G Justice, Carlsbad, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/482,826

(22) Filed: Jan. 13, 2000

(51) Int. Cl.[7] .................................................. G01J 1/32
(52) U.S. Cl. .................................. 250/205; 250/214 R
(58) Field of Search ............................ 250/205, 214 R, 250/239, 216, 208.1, 559.4, 214 RC; 315/182; 128/664–666, 634, 692; 356/40–42, 51

(56) References Cited

U.S. PATENT DOCUMENTS 5,753,903 A * 5/1998 Mahaney .................... 250/205

* cited by examiner

Primary Examiner—Que T. Le

(57) ABSTRACT

A lighting arrangement for use in vision systems and imaging applications. The arrangement illuminates the object to be imaged with a supplied light of a specified illumination. The intensity, hue, and directionality of the supplied light can be varied. The desired illumination is specified either by manually operable controls or via a programming interface. The arrangement has a light source which includes light-emitting diodes mounted in a housing. The source provides a constant light output over a long lifetime. A light sensor senses the total illumination on the object being imaged resulting from ambient light in addition to the supplied light, and a negative feedback circuit in the arrangement can adjust the level of the supplied light in response so as to maintain a constant total illumination on the object despite variations in the ambient lighting.

12 Claims, 7 Drawing Sheets

LIGHT ARRANGEMENT FOR VISION SYSTEMS

FIELD OF THE INVENTION

The present invention relates generally to lighting sources for photographic imaging applications, and more particularly to computer-controlled lighting sources for vision systems used in testing of products, components, or sub-assemblies.

BACKGROUND OF THE INVENTION

In modern manufacturing environments, vision systems are often used to test products, components, or sub-assemblies in order to verify that the item has been properly manufactured or assembled. A vision system performs, in an automated way, a visual inspection analogous to that which would otherwise be done by a person. Among other benefits, the vision system can relieve a human operator of the tedium associated with such an inspection, thus freeing him to perform other functions, and can automatically maintain quality records and analyze trends so as alert the manufacturing personnel of actual or potential quality problems with the manufactured item.

Vision systems typically utilize a video camera to capture and digitize images of the item being tested, and a computer connected to the video camera to analyze the digitized images and compare them to what is expected to be observed. For the vision system to operate properly—that is, to correctly identify tested items as being either good or bad—each item being tested must be appropriately illuminated for the vision test being performed. If items are illuminated improperly, the vision system may incorrectly identify a good item as a bad one, and reject it. Incorrectly rejecting a significant number of good items results in increased manufacturing costs which ultimately get passed on to the consumer.

In order to minimize the number of items which are incorrectly rejected by the vision system as non-complying, once the appropriate level of illumination for a particular test is determined, the light source should be capable of providing a certain constant light output (or intensity) for desired intervals over a long period of time. Furthermore, if a varying amount of ambient light can also illuminate the item during testing, the light source should be capable of both detecting this ambient illumination and varying its light output so as to maintain the total illumination on the item at a constant level.

Certain vision applications require the light source to provide light of different intensities during different tests, or for testing different items. For example, two identical items supplied from different vendors or produced from two different manufacturing runs may have different reflectivity, requiring different illumination levels for the vision system to operate properly. Or, in one test the vision system may view the item through a protective wrapping that requires more illumination, and in another test without the wrapping that requires less illumination.

Other vision applications require the light source to provide different color lighting. For example, a first color light may be used to view surface features on a partially-transparent window of an item, while a second color light is used to view the internal features of the item through the window.

In addition, to view surface features of an item that project in a direction towards the video camera lens, it is advantageous for the light source to provide side, rather than frontal, illumination. Providing side illumination to these surface features can generate shadows which are more easily detected by the vision system. Also, when illuminating highly reflective items, side illumination may reduce certain reflections which can interfere with proper vision system operation.

Some previous light sources use halogen or incandescent lighting, which often are subject to fading over time. In addition, such light sources tend to have relatively short lifetimes, requiring frequent replacement of the light sources. These light sources also tend to generate excessive heat which often requires cooling so as not to affect the item being tested or other elements of the vision system, thus resulting in added cost or complexity of the light source. While fluorescent light sources tend not to produce excessive heat, fading over time is still a problem. With any of the above light sources, filters are required in order to provide different color light output. Such filters are expensive, not easily changed, and provide only a limited number of discrete light colors. Other previous vision system light sources use light-emitting diodes of a certain color. Where the intensity of any of these light sources is selectable, it is typically done manually.

Accordingly, the need still exists for a light source that can produce a specified light output of a specified color, can maintain a constant light output for desired intervals over a long period of time, and can automatically adjust the light output so as to maintain a constant illumination level on an object under a variety of ambient lighting situations.

SUMMARY OF THE INVENTION

In a preferred embodiment, the present invention may be implemented as a novel lighting arrangement that produces a constant light output of a specified intensity, and of a specified hue and direction, over a long lifetime, and can automatically adjust the light output in the presence of ambient light in order to maintain a contain illumination on the object being illuminated. Such a lighting arrangement can be advantageously used in vision system applications in manufacturing and inspection, where consistent lighting of the objects to be tested or inspected under all ambient lighting conditions is essential to accurate operation of the vision system and avoiding incorrect rejection of conforming objects.

The lighting arrangement includes a light source which generates a predetermined light output in response to a light control signal provided by a light controller which is electrically connected to the light source. The light source is mounted in a housing which, during operation, is positioned near the object to be illuminated. The light controller has an input connectable to the vision system so that the vision system can specify to the light controller the predetermined light output to be provided by the light source. The light source has a plurality of lighting elements mounted in the housing. The lighting elements are preferably each controllable independently. While the housing can take a variety of shapes, a preferred embodiment is a toroidally-shaped housing where the lighting elements are arranged on one of the planar surfaces of the housing so as to evenly illuminate an object positioned adjacent that planar surface. The housing may include a diffuser mounted between the lighting elements and the object. At least some of the lighting elements of the preferred embodiment are light-emitting diodes. These diodes may all generate light of essentially the same color or hue, or at least some of the light-emitting diodes emit light of a different hue from at least some others of the light-emitting diodes; in addition, by varying the intensity of light emitted from the different color diodes, the hue of the light output can be varied. Alternatively, light-emitting diodes that emit light of a variable hue can be used in other embodiments. The intensity of the light emitted by each light-emitting diode is controlled by pulse width modulation. All the diodes may be pulse-width modulated in the same way so as to produce light of the same intensity, or different pulse width modulation signal may be applied to different light-emitting diodes so that different diodes emit light of a different intensity. By varying the intensity of light output based on the position of the light-emitting diodes in the housing, the directionality of the illumination on the object may be varied.

Another embodiment of the present invention is a lighting arrangement which provides a predetermined illumination on an object which is illuminated by a varying ambient light as well as light supplied from the light source. The lighting arrangement includes an illumination sensor positioned near the object which detects the total illumination on the object resulting from both the supplied light and the ambient light. The sensor produces an illumination signal proportional to the total illumination, and this signal is electrically transmitted to the light controller. A negative feedback circuit in the light controller varies the light control signal in response to the illumination signal so as to maintain the predetermined illumination on the object. The desired level of predetermined illumination can be externally specified to the lighting arrangement, such as by a vision system, via a programming interface on the light controller. Alternatively, the predetermined illumination level can be set by manual controls on the lighting arrangement. Typically, the light sensor is mounted in the same housing containing the lighting elements.

Yet another embodiment of the present invention is a method for illuminating an object with a predetermined illumination. The method includes specifying the predetermined illumination desired, and applying light of an initial intensity level derived from the predetermined illumination. The total illumination on the object resulting from applying the initial intensity level light is sensed, and then a corrected intensity level based on the initial intensity level set and the total illumination sensed is determined. Then light of the corrected intensity level is reapplied so as to illuminate the object with the desired illumination. Typically the object is also illuminated by ambient light as well as the light supplied from the lighting arrangement, and so the total illumination sensed includes the ambient light illumination on the object as well as the supplied light illumination. Preferentially, in order to compensate for fluctuations in the ambient light illumination, the total illumination is periodically sensed, and a new corrected intensity level determined and reapplied, so as to maintain the predetermined illumination.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
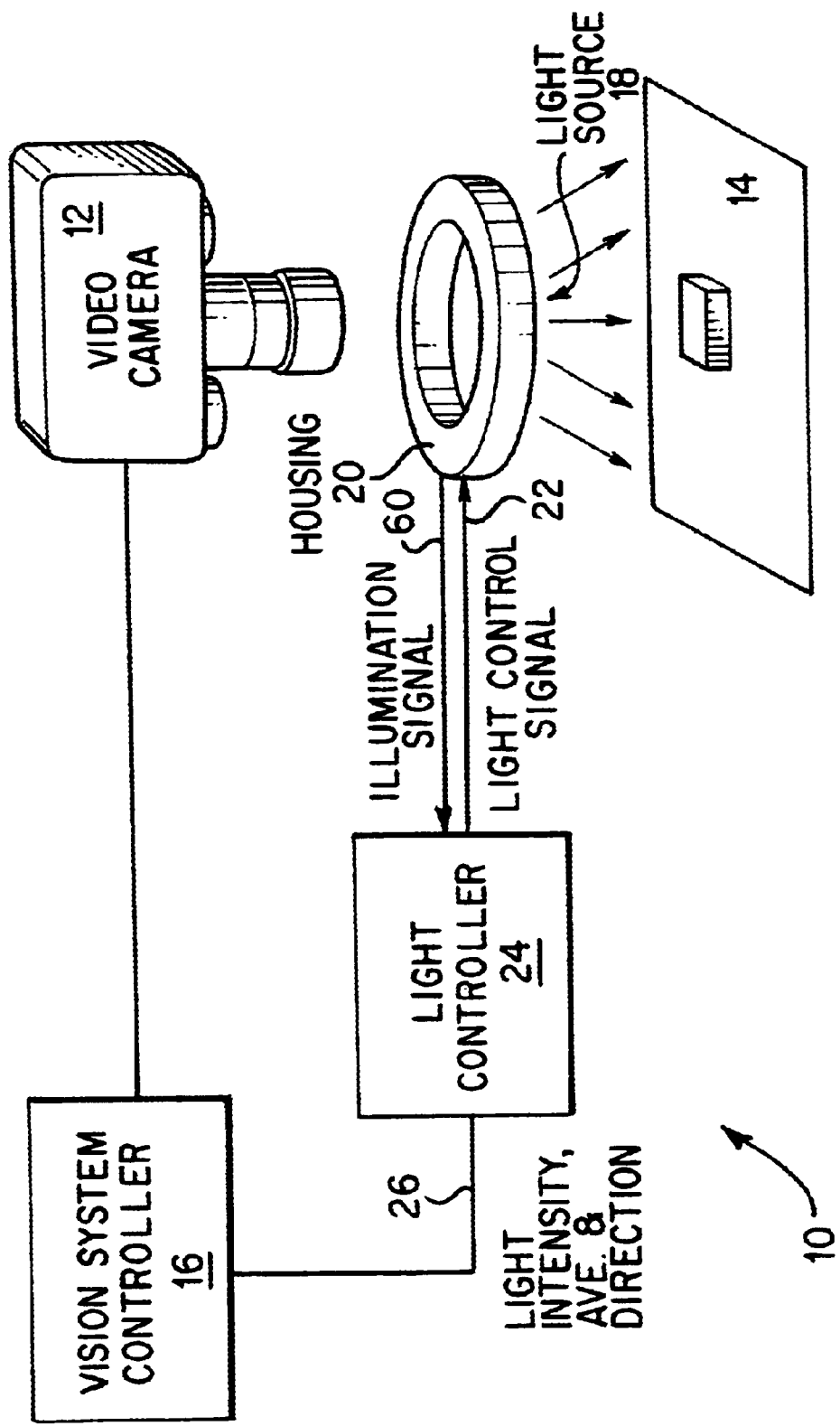
FIG. 1 is a schematic block diagram of a vision system embodying the present invention.

Referring now to the drawings, and more particularly to FIG. 1, there is illustrated a schematic representation of a vision system 10 embodying the present invention. Such a system is capable of producing a constant light output of a specified intensity, and of a specified hue and direction, over a long lifetime, and can automatically adjust the light output in the presence of ambient light in order to maintain a contain illumination on the object being illuminated. While it is apparent to those skilled in the art that the exact vision system components may vary from system to system, the vision system 10 includes a video camera 12 capable of capturing digitized images of an item under test 14 and transferring the images to a vision system controller 16. The system 10 includes a light source 18 for illuminating the item 14 while the video camera 12 is capturing images. The light source 18 is mounted in a housing 20 that is positionable in optical proximity to the item 14 such that light from the light source 18 illuminates the item 14 during operation of the video camera 12. The light source 18 generates a predetermined illumination in response to a light control signal 22 generated by a light controller 24 in electrical communication with the light source 18. The light controller 24 includes an input 26 for receiving from the vision system controller 16 an illumination command specifying the predetermined illumination. The illumination command may include such light source parameters as the light intensity, light color, and directionality of the light with respect to the item 14 as will be discussed subsequently in greater detail.

Figure 2:
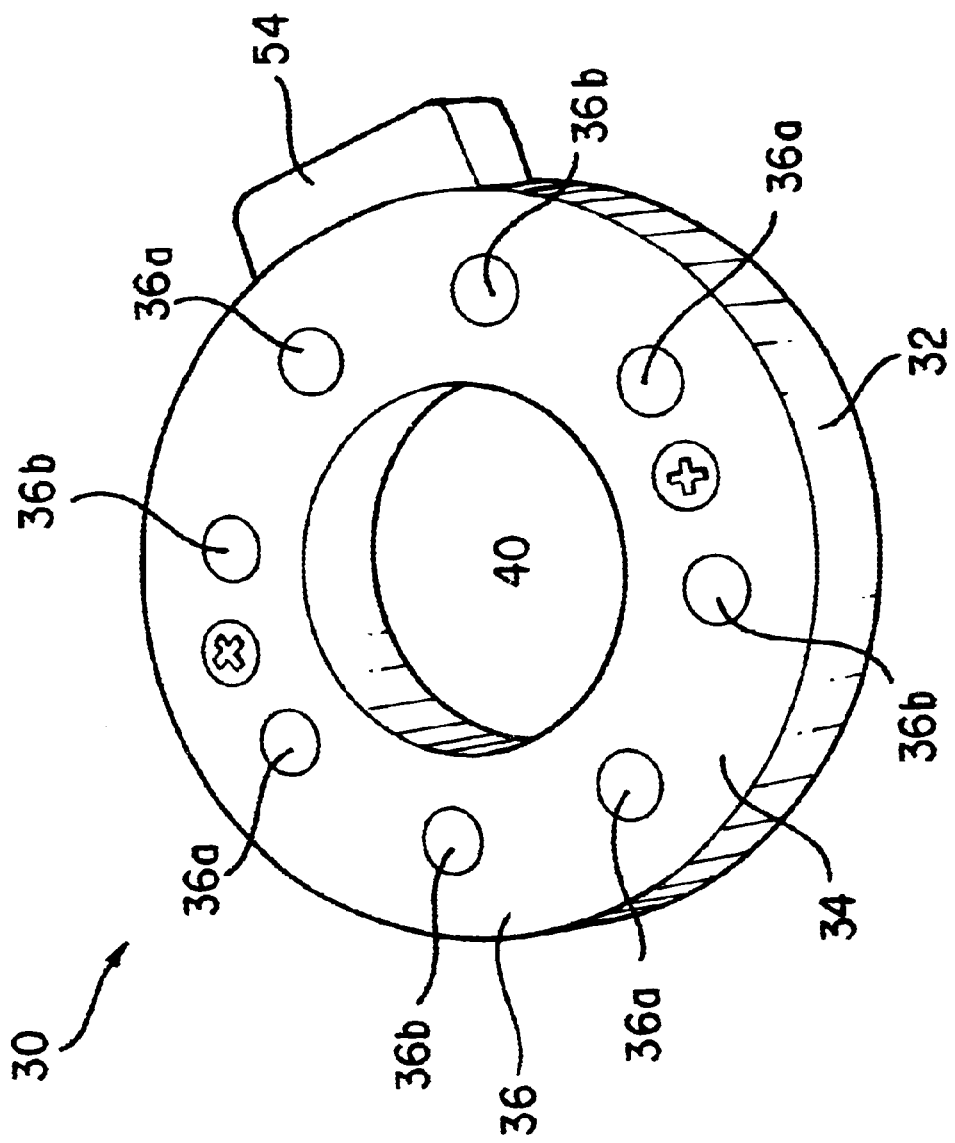
FIG. 2 is a perspective view of a light source according to the present invention usable in the vision system of FIG. 1.

Considering now the light source 18 in further detail and with reference to FIG. 2, the light source 18 includes a plurality of lighting elements disposed in the housing 20. The housing 20 can be physically organized into different shapes and configurations according to the present invention. One preferred embodiment of the housing 20 is a ring light 30. The ring light 30 has a toroidally-shaped housing 32, with the lighting elements 36*a,b* disposed around one of the planar surfaces 34 of the toroid. The ring light 30 has an aperture through which the lens of the video camera 12 can be aimed to view the item 14 illuminated by the light source 18. In some embodiments, the planar surface 34 may be covered by a diffuser 38 which diffuses the light emitted by the lighting elements 36*a,b* so as to more evenly illuminate the item 14. The diffuser 38 also physically protects the lighting elements 36*a,b*.

Figure 3:
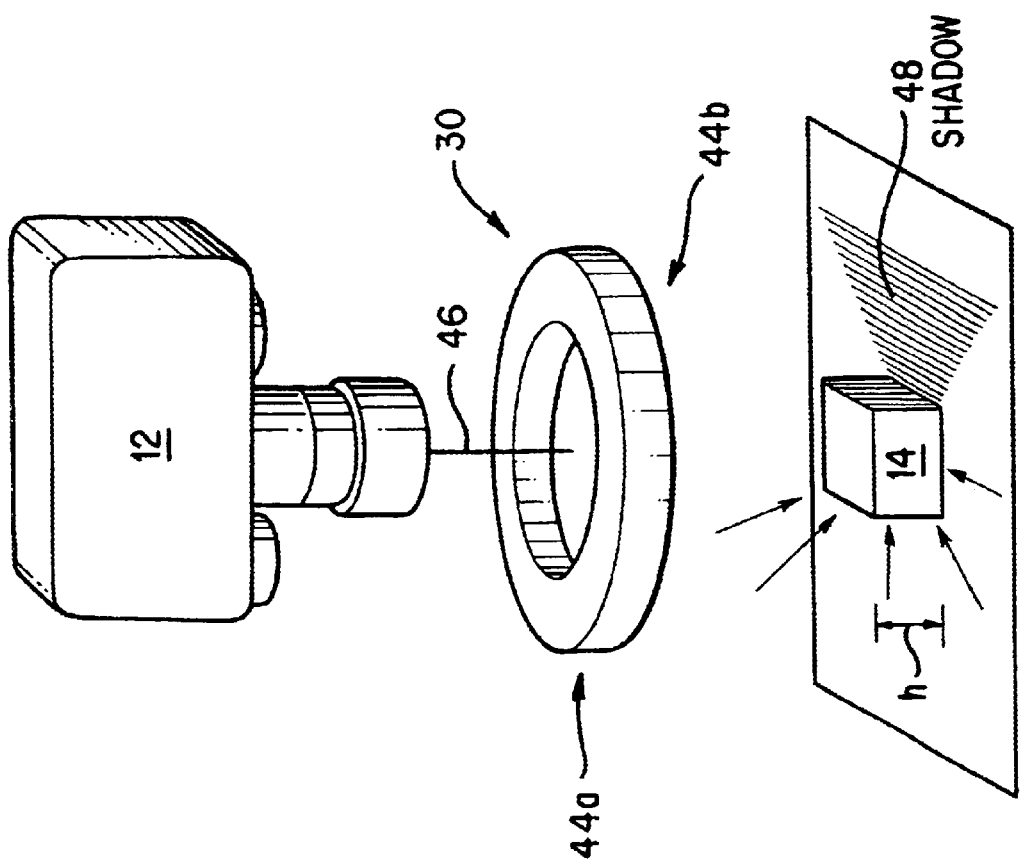
FIG. 3 is a schematic block diagram of the light source of FIG. 2 illustrating directional light sourcing.

Considering now the lighting elements 36*a,b* of the light source 18 in further detail, in the preferred embodiment the lighting elements are light-emitting diodes (LEDs). In comparison to halogen, incandescent, or fluorescent lighting elements, LEDs have a much longer lifetime and are not subject to fading over that lifetime. LEDs also turn on and off faster than do these other types of lighting elements. The intensity of the light emitted from the LEDs is preferably controlled by pulse width modulation by the light controller 24, where the duty cycle of the power signal applied to each of the LEDs by the light controller 24 determines the intensity. A higher duty cycle generates a higher intensity light. The light controller 24 can typically supply a discrete number of different duty cycles, preferably 256, in order to provide a range of possible light intensities from the LEDs. The intensity of each LED may be controlled independently of the intensity of other LEDs. As best understood with reference to FIG. 3, this allows the directionality of the lighting on the item 14 generated by the ring light 30 to be varied. For example, the LEDs located in quadrant 44a of ring light 30 may be turned on with a relatively high intensity, which those LEDs located in the other three quadrants 44b of ring light 30 may be turned off or illuminated at a much lower level. The incident lighting provided to item 14 will be seen by the video camera 12 as directional light coming from the side of the image nearest to quadrant 44a. If the vision system is required to determine the size or location of surface features which are in the same direction as the axis of 46 of camera 12, such as a height h of item 14, the shadow 48 cast by the directional lighting can facilitate this testing.

All the LEDs 36a,b may emit light of essentially the same color (or hue), or different color LEDs may be using in a single ring light 30. For example, LEDs 36a may be red, while LEDs 36b may be green. The intensity of red LEDs 36a may be controlled by light controller 24 independently of the intensity of green LEDs 36b. For example, red LEDs 36a may be illuminated while green LEDs 36b are turned off to provide a red light, then green LEDs 36b may be illuminated while red LEDs 36a are turned off to provide a green light. If both the red and green LEDs are illuminated to provide equal light intensities, a yellow (or brown) light will result; the hue may be varied by varying the relative intensities of the red and green LEDs. Even though the video camera 12 may provide only black-and-white images to the vision system, in certain applications different color lights facilitate the testing of an item 14. For example, a first color light may be used to view surface features on a partially-transparent window of item 14, while a second color light may be required to view internal features of the item 14 through the window.

Figure 4:
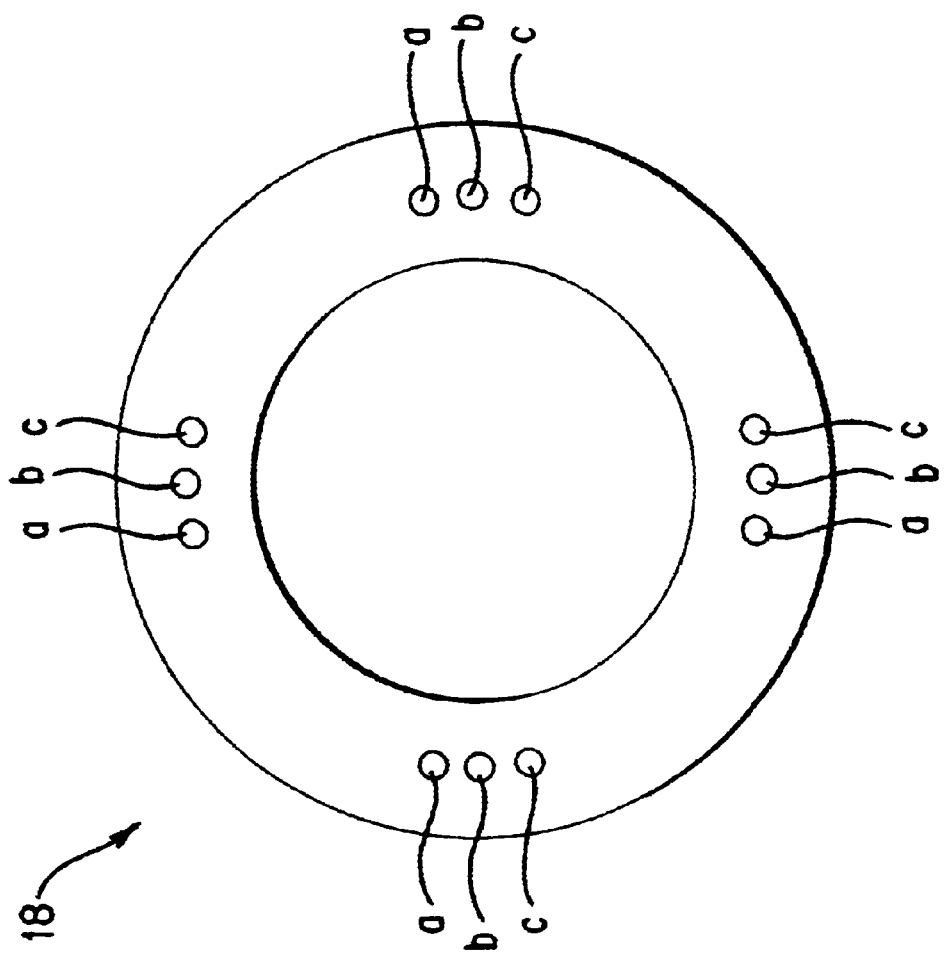
FIG. 4 is a planar view of a variable-hue light source according to the present invention.

In another embodiment of the light source 18, and as best understood with reference to FIG. 4, the light source 18 may contain red 36a, green 36b, and blue 36c LEDs to allow a range of different illumination hues to be provided by the light source 18 by choosing different intensities for each of these primary colors. Alternatively, variable-hue LEDs, each of which is capable of providing light in a range of hues, may be used for any of the LEDs 36.

Figure 5:
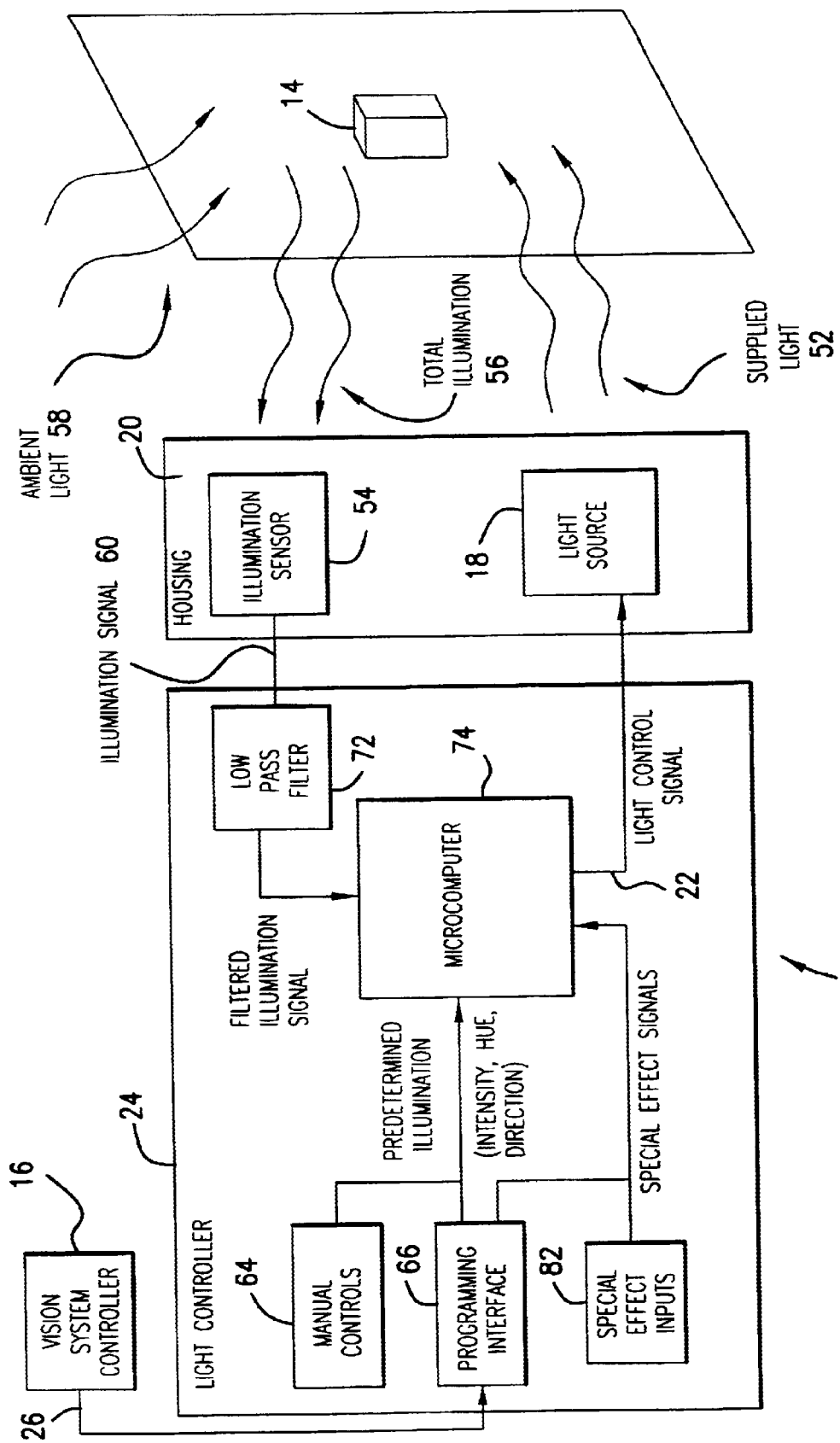
FIG. 5 is a schematic block diagram of a lighting arrangement according to the present invention.

A preferred embodiment of the present invention, as best understood with reference to FIG. 5, is a lighting arrangement 50 for providing a predetermined illumination on an item 14 where the item 14 may also be illuminated by ambient light 58. The lighting arrangement 50 includes a light source 18 positioned in optical proximity to the item 14 which, during operation, illuminates the item 14 with a supplied light 52 of a certain intensity in response to a light control signal 22 from a light controller 24. The lighting arrangement 50 further includes an illumination sensor 54 also positioned in optical proximity to the item 14 which, during operation, detects the total illumination 56 resulting from both the supplied light 52 and the ambient light 58. The illumination sensor 54 is preferable a reflective sensor which detects light reflected by the item 14 and other nearby objects illuminated by the light source 18. The sensor 54 produces an illumination signal 60 which is proportional to the total illumination on the item 14. Typically the light source 18 and illumination sensor 54 are mounted within a housing 20, with the sensor 54 located in the same planar surface (such as the surface 34) in which the lighting elements of the source 18 are located.

The lighting arrangement 50 also includes a light controller 24 which is electrically connected to the illumination sensor 54 and the light source 18. As will be discussed subsequently in further detail, the light controller 24 has a negative feedback circuit for producing the light control signal 22 in response to the illumination signal 60 so as to maintain the predetermined illumination on the object. The lighting arrangement 50 further includes at least one mechanism to specify to the light controller 24 the desired predetermined illumination, parameter of which may include the intensity, hue or color, and directionality. In a preferred embodiment, the light controller 24 has manually operable controls 64, such as pushbuttons or rotary knobs, which electrically specify the predetermined illumination to the electronic circuitry with the light controller 24. Alternatively, the light controller 24 has an programming interface 66 through which a computer or computer-controlled device (such as the vision system controller 16) can transmit electrical signals corresponding to the predetermined illumination to the light controller 24. Typical programming interfaces usable with the lighting arrangement 50 include serial ports such as RS-232C or USB (unified serial bus), and parallel ports such as a Centronics interface. Other manually operable controls 64 and programming interfaces 66 known to those skilled in the art are usable with the present invention for specifying the predetermined illumination as well as those described herein.

Figure 6:
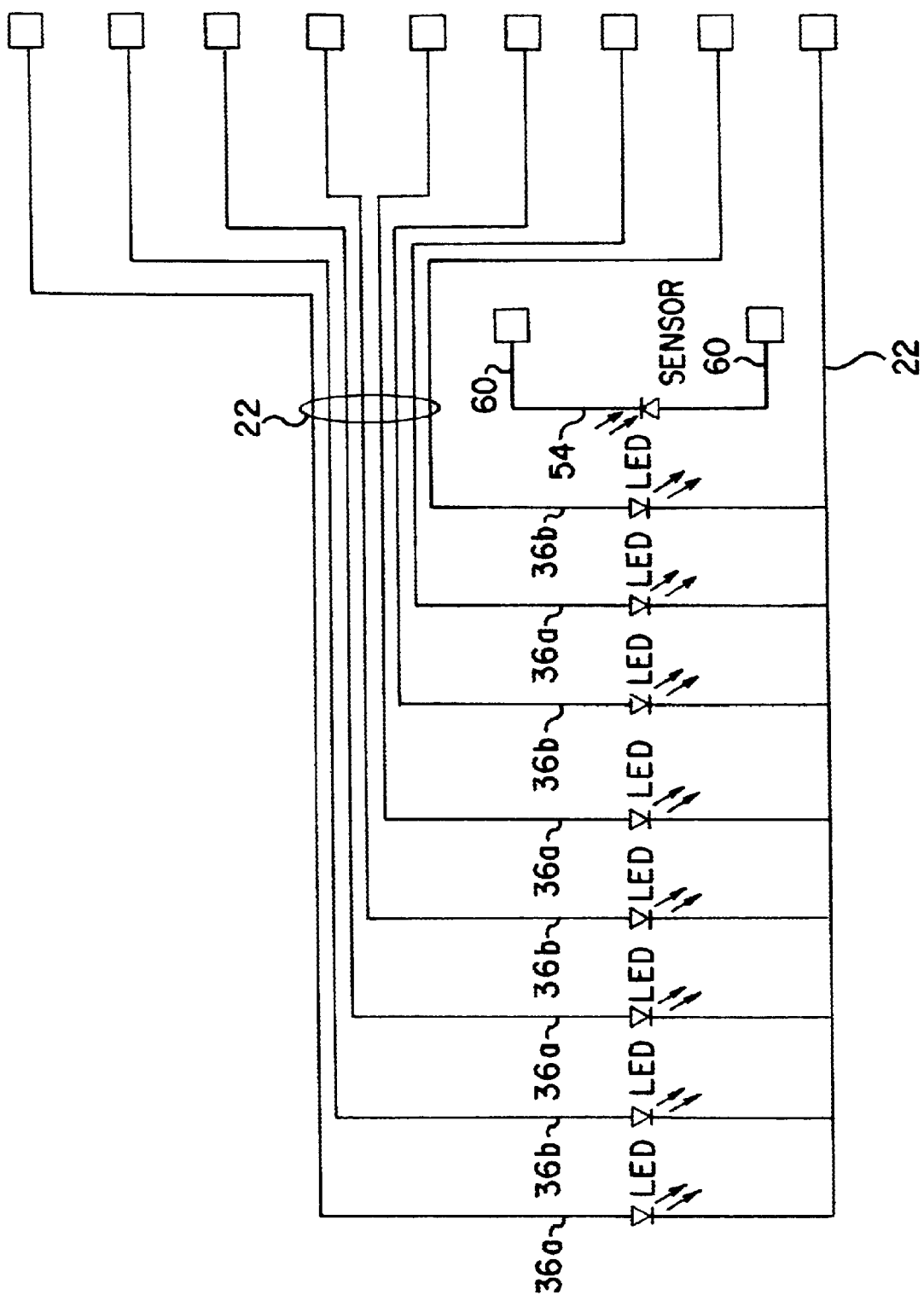
FIG. 6. is an electrical schematic diagram of the light source of FIG. 2.

Considering now in further detail the operation of the light controller 24, and as best understood with reference to FIGS. 2, 5 and 6, the light controller 24 generates a light control signal which is transmitted to light source 18 via light control signal bus 22. Typically bus 22 contains a control line for each individual LED 36a,b in the light source 18, and a common return line. The light control signal has an independent pulse width modulated signal for each LED 36a,b in the light source 18. As previously explained, the pulse width modulation determines the intensity of the light emitted from LEDs 36a,b. Also as previously explained, where LEDs 36a produce light of a different color than LEDs 36b, the hue of light produced from light source 18 can be varied by sending different intensity signals to LEDs 36a than those sent to LEDs 36b.

With regard to the use of the variable-hue LEDs 36 mentioned heretofore, these LEDs 36 typically contain red, blue, and green elements, each element having a separate pulse width modulation control line. By independently varying the pulse width modulation applied to each of these control lines, the overall hue produced by LEDs 36 can be varied as desired.

In some embodiments, individual LEDs 36a,b are not turned off totally during operation, but rather their intensity is reduced to a minimum level, so that the operator can easily verify visually that the light source 18 is properly connected to the light controller 24 and that all lighting elements of the light source 18 are operating properly.

In a preferred embodiment, an illumination signal is transmitted from illumination sensor 54 to light controller 24 via an illumination signal bus 60. The illumination sensor 54 preferentially consists of a single photodiode, but an array of photodiodes, or other light sensor arrangements known to those skilled in the art, may alternatively be used with the present invention. The illumination sensor 54 typically provides a signal whose level is proportional to the total illumination 56 sensed by the sensor 54, and can be calibrated appropriately to determine the total illumination 56. If photodiodes with fast response times are utilized for the sensor 54, the sensor output can be filtered by a low-pass filter 72 in order to remove unwanted effects, such as a response to the 60 hertz frequency of ambient fluorescent lighting, or to the pulse-width modulation frequency of the LEDs. Typically a 5 hertz filter will remove such unwanted effects, but still allow the lighting arrangement 50 to respond properly to lower frequency changes in ambient lighting 58, such as might be caused by the operator leaning over and momentarily blocking the ambient light 58 from the item 14.

A microcomputer 74 controls the operation of the light controller 24. The microcomputer 74 typically includes a memory (for example, an EERAM) for storing a control program, read/writeable memory (for example, an EERAM) for storing data while power is applied to the controller 24, and non-volatile read/writeable memory (for example, NVRAM) for storing data (such as the most recent predefined illumination) when power is not applied to the controller 24. The microcomputer 74 also typically includes an analog input for receiving the filtered illumination signal from the low-pass filter 72, a digital input for receiving illumination commands from the programming interface 66, inputs for receiving illumination information from the manually operable controls 64, and outputs for generating the light control signal for the light source 18. As will be discussed subsequently, in some embodiments the microcomputer 74 also includes an input port for receiving special effects signals. The microcomputer 74 can alternatively be implemented as a microprocessor and external memory and logic circuitry, a digital signal processor (DSP), a state machine, or other such control systems known to those skilled in the art.

Figure 7:
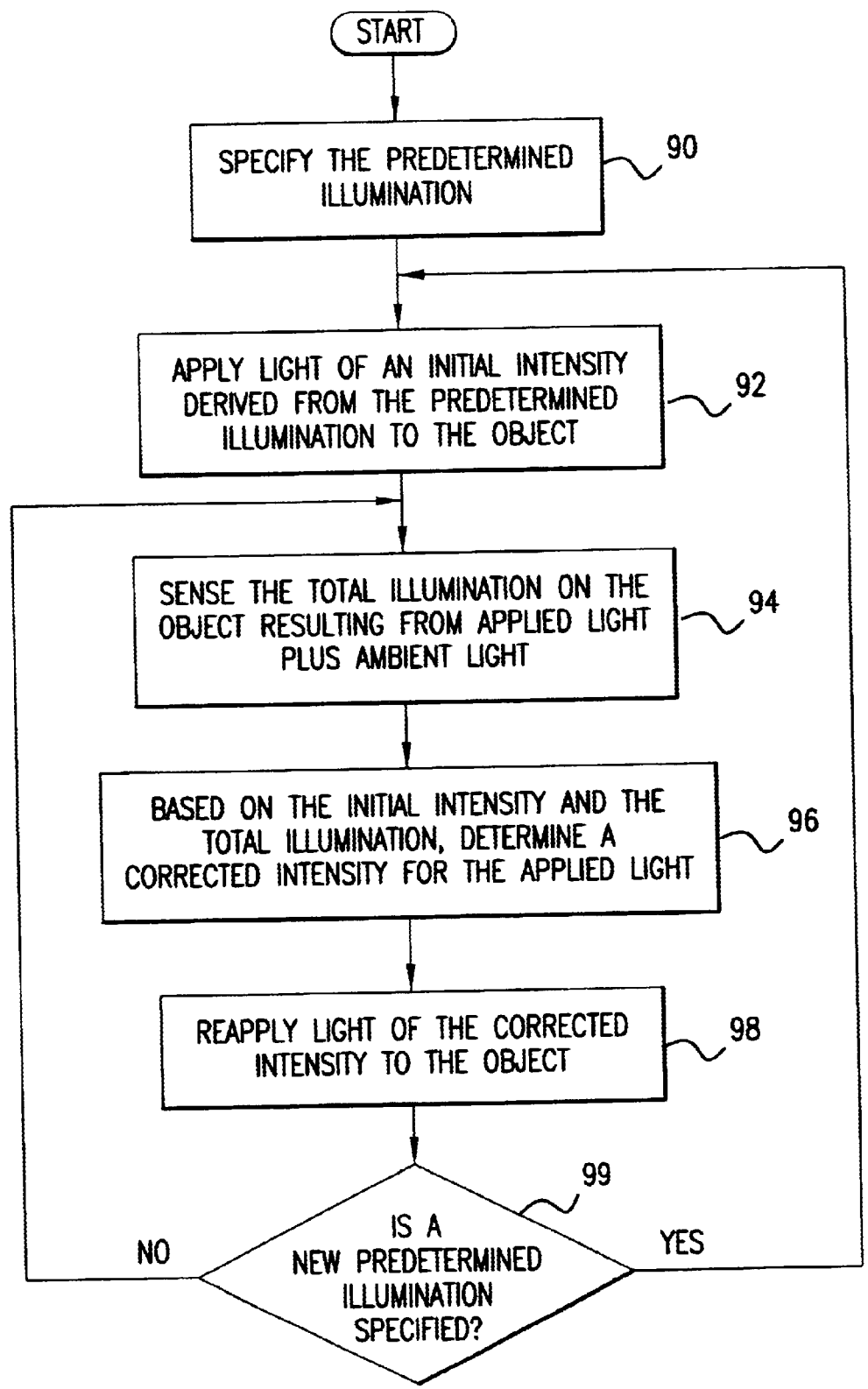
FIG. 7 is a flowchart of a method for illuminating an object with a predetermined illumination using the lighting arrangement of FIG. 5.

As best understood with reference to FIG. 7, the microcomputer 74 performs a control method to produce and maintain a predetermined illumination on the item 14. The method begins, at 90, with a predetermined illumination that is specified to the light controller 24 via the programming interface 66 or the manually operable controls 64. The microcomputer 74 then applies to the item 14 supplied light 52 of an initial intensity level derived from the predetermined illumination, by producing a light control signal corresponding to the initial illumination and transmitting it to the light source 18 (at 92). Next, at 94, the total illumination 56 on the item 14 resulting from applying the initial intensity level light is sensed by the illumination sensor 54 and measured by the microcomputer 74. Based on the total illumination 56 and the initial intensity level, the microcomputer 74 then determines 96 a corrected light intensity level that will result in the desired total illumination 56 being applied to item 14. Then, the microcomputer 74 reapplies 98 to the item 14 supplied light 52 of the corrected intensity level, by producing a light control signal corresponding to the corrected illumination. Because the sensing of light by the illumination sensor 54 includes sensing any ambient light 58 which is also illuminating the item 14, this method compensates for the ambient light 58 by correspondingly reducing the amount of supplied light 52 so as to result in item 14 being illuminated with the desired predetermined illumination even in the presence of the ambient light 58. Because the intensity of the ambient light level can change, or the amount of ambient light 58 reaching the item 14 can be obstructed, the sensing, determining, and reapplying are repeated at a certain interval (in the absence of a new predetermined level being specified) so as to maintain the predetermined illumination regardless of fluctuations in the ambient light illumination ("No" branch of 99). When a new predetermined illumination is specified, the method is repeated ("Yes" branch of 99) beginning at 92. While the above implementation of maintaining the predetermined illumination on the item is performed digitally by a microcomputer 74, those skilled in the art will recognize that analog negative feedback circuit known in the art can also perform the same function.

In some embodiments, the light controller 24 also includes special effect inputs 82. Each of these inputs generates a special effects signal that is detected by the microcomputer 74. In some embodiments, special effects signals can also be transmitted to the programming interface 66 of the light controller 24 from an external source such as the vision system controller 16. Special effect programs can be defined in the microcomputer 74 and performed whenever the corresponding special effects signal is detected. For example, a signal can be predefined to "flash" the light source 18 by doubling the intensity level on all LEDs 36a,b whenever the signal is received. Another signal might be predefined to change the color of the lights by alternately illuminating red LEDs 36a and green LEDs 36b each time the signal is received. Or, a signal may be predefined to "ramp" the intensity level on all LEDs 36a,b from minimum to maximum at a certain rate and then return to the previous illumination settings. By using the appropriate control program, the light controller 24 can be configured to perform other such useful special lighting effects upon receipt a special effect signal. In the preferred embodiment, each of the special effect inputs has circuitry which allows a 5 to 30 volt electrical signals to trigger the special effect. Such circuitry is both TTL compatible, and compatible with the factory floor standards used in the manufacturing environments in which vision systems are frequently employed.

From the foregoing it will be appreciated that the lighting arrangement and method provided by the present invention represents a significant advance in the art. A lighting arrangement can be constructed according to the present invention so as to produce a constant light output of a specified intensity, and of a specified hue and direction, over a long lifetime, and can automatically adjust the light output in the presence of ambient light in order to maintain a contain illumination on the object being illuminated. Although several specific embodiments of the invention have been described and illustrated, the invention is not to be limited to the specific methods, forms, or arrangements of parts so described and illustrated. In particular, the negative feedback functions described herein can alternatively be performed by another computer attached to the light controller, such as the vision system controller, rather than by a microcomputer in the light controller, resulting in a simpler "dumb" rather than "smart" light controller. The shape and configuration of the light source can be varied from the embodiments illustrated herein without diverging from the present invention. Furthermore, the lighting arrangement described herein is not limited to applications involving vision systems in manufacturing or quality control applications, but also can advantageously provide lighting for other imaging applications, such as close-up photography or dental photography. The invention is limited only by the claims.

What is claimed is:

1. A lighting arrangement for illuminating an object to be observed by a vision system, comprising:

a light source for generating a predetermined light output in response to a light control signal;

a housing positionable in optical proximity to the object, the light source disposed in the housing such that the light illuminates the object during observation by the vision system; and a light controller in electrical communication with the light source for supplying the light control signal, the light controller including an input for receiving from the vision system a command specifying the predetermined light output.

2. The lighting arrangement of claim 1, wherein the light source includes a plurality of lighting elements each disposed in a corresponding one of a plurality of locations in the housing.

3. The lighting arrangement of claim 2, wherein at least some of the lighting elements are light-emitting diodes.

4. The lighting arrangement of claim 3, wherein the predetermined light output includes a hue, and at least some of the light-emitting diodes emit light of essentially the same hue.

5. The lighting arrangement of claim 3, wherein the predetermined light output includes a hue, and at least some of the light-emitting diodes emit light of a different hue from at least some others of the light-emitting diodes.

6. The lighting arrangement of claim 5, wherein the intensity of light emitted from the at least some light-emitting diodes is independent of the intensity of light emitted from the at least some other light-emitting diodes in order to vary the hue of the light output.

7. The lighting arrangement of claim 3, wherein at least some individual ones of the light-emitting diodes emit light of a variable hue.

8. The lighting arrangement of claim 3, wherein the intensity of light emitted by each light-emitting diode is controlled by pulse width modulation.

9. The lighting arrangement of claim 3, wherein the housing is a toroid having at least one light-transmitting planar surface, and wherein the light emitting diodes are disposed around the toroid so as to evenly illuminate the object with light transmitted through the light-transmitting planar surface.

10. The lighting arrangement of claim 9, wherein the light-transmitting planar surface further includes a diffuser mounted between the light emitting diodes and the object.

11. The lighting arrangement of claim 3, wherein at least some of the light-emitting diodes emit light of a different intensity from at least some others of the light-emitting diodes.

12. The lighting arrangement of claim 11, wherein the intensity of light emitted from the at least some light-emitting diodes is independent of the intensity of light emitted from the at least some other light-emitting diodes so as to vary the directionality of the illumination on the object.

* * * * *